(12) United States Patent
    Maercovich

(10) Patent No.: US 8,152,135 B2
(45) Date of Patent: Apr. 10, 2012

(54) AUTOMATIC FLUSH ACTUATION APPARATUS

(76) Inventor: Jorge Maercovich, Woodland Hills, CA (US)

( * ) Notice: Subject to any disclaimer, the term of this patent is extended or adjusted under 35 U.S.C. 154(b) by 380 days.

(21) Appl. No.: 12/586,199

(22) Filed: Sep. 18, 2009

(65) Prior Publication Data

US 2010/0012196 A1    Jan. 21, 2010

Related U.S. Application Data

(60) Continuation-in-part of application No. 12/454,775, filed on May 21, 2009, now Pat. No. 7,862,001, which is a continuation of application No. 12/215,553, filed on Jun. 27, 2008, now Pat. No. 7,552,905, which is a continuation of application No. 11/801,928, filed on May 11, 2007, now Pat. No. 7,407,147, which is a division of application No. 11/192,627, filed on Jul. 29, 2005, now Pat. No. 7,232,110, which is a division of application No. 11/004,704, filed on Dec. 3, 2004, now Pat. No. 7,028,977, which is a division of application No. 10/640,693, filed on Aug. 14, 2003, now Pat. No. 6,845,961, which is a continuation-in-part of application No. 10/377,124, filed on Feb. 28, 2003, now Pat. No. 6,840,496.

(51) Int. Cl.
    *F16K 31/02* (2006.01)

(52) U.S. Cl. .......................... 251/129.04; 251/40; 4/623

(58) Field of Classification Search .................... 251/33, 251/38, 40, 129.04; 4/DIG. 3, 313, 623
See application file for complete search history.

(56) References Cited

U.S. PATENT DOCUMENTS

| | | | | |
|---|---|---|---|---|
| 2,388,990 | A * | 11/1945 | Nelson et al. | 335/257 |
| 4,272,052 | A * | 6/1981 | Gidner | 251/39 |
| 5,125,621 | A * | 6/1992 | Parsons et al. | 251/30.03 |
| 5,244,179 | A * | 9/1993 | Wilson | 251/30.03 |
| 6,056,261 | A * | 5/2000 | Aparicio et al. | 251/129.03 |
| 6,840,496 | B2 * | 1/2005 | Maercovich et al. | 251/129.03 |
| 6,974,118 | B2 * | 12/2005 | Maercovich et al. | 251/129.03 |
| 7,552,905 | B2 * | 6/2009 | Maercovich et al. | 251/40 |
| 7,862,001 | B2 * | 1/2011 | Maercovich et al. | 251/40 |

* cited by examiner

*Primary Examiner* — John Fristoe, Jr.
(74) *Attorney, Agent, or Firm* — Raymond Y. Chan; David and Raymond Patent Firm

(57) ABSTRACT

An automatic flush actuation apparatus, which is incorporated with a flushing system having a water inlet, a water outlet, and a water chamber communicating therebetween, that includes a valve member being moved by a flush lever for releasing the water pressure within the water chamber to allow the water passing from the water inlet to the water outlet, and a sensor-operated powering assembly including a relief valve provided at the valve member for controlling the water flowing to the water outlet and an actuator arranged in such a manner that while sensing a presence of a user of the flushing system, the actuator is driven to move the relief valve to an opened position for releasing the water pressure within the water chamber to allow the water passing to said water outlet.

20 Claims, 14 Drawing Sheets

| Urinal Mode | Delay Time-Low Volume | |
|---|---|---|
| | 90ms = 0.5gpf | |
| | | |
| | Delay Time-High Volume | |
| | 200ms = 1.0gpf | |
| | | |
| Toilet Mode | Delay Time-Low Volume | Time Sequence |
| | 200ms = 1.0gpf | 0-39 seconds |
| | 260ms = 1.2gpf | 40-59 seconds |
| | 430ms = 1.6gpf | 60 > seconds |
| | | |
| | Delay Time-High Volume | Time Sequence |
| | 260ms = 1.2gpf | 0-39 seconds |
| | 430ms = 1.6gpf | 40-59 seconds |
| | 1500ms = 3.25gpf | 60 > seconds |

FIG. 9

Switch Adjustment Reference Chart

| Switch # | Function |
|---|---|
| | ■ = Switch |
| 1 | Sensor Range |
| 2 | Sensor Range |
| 3 | Water Saver (Urinal Only) |
| 4 | Ghost Flush (24hr) |
| 5 | Flush Volume (Low/High) |
| 6 | Urinal/Toilet Mode |

FIG. 10B

SWITCH ADJUSTMENT GUIDE

UP
■ SWITCH
DOWN

SENSOR DISTANCE

30" (75CM) — 1, 2
26" (65CM) — 1, 2
22" (55CM) — 1, 2
18" (45CM) — 1, 2

FLUSH MODE (URINAL ONLY)

NORMAL (EVERY TIME) — 3
WATER SAVER (EVERY OTHER TIME) — 3

GHOST FLUSH

OFF — 4
ON (24 HOUR) — 4

FLUSH VOLUME

TOILET MODE-LOW VOLUME — 5
TOILET MODE-HIGH VOLUME — 5
URINAL MODE-LOW VOLUME — 5
URINAL MODE-HIGH VOLUME — 5

FIXTURE MODE

TOILET — 6
URINAL — 6

FIG. 10C

AUTOMATIC FLUSH ACTUATION APPARATUS

CROSS REFERENCE OF RELATED APPLICATION

This is a Continuation-In-Part application that claims the benefit of priority under 35 U.S.C. §119 to a non-provisional application having an application Ser. No. 12/454,775 and a filing date of May 21, 2009, now U.S. Pat. No. 7,862,001 which is a Continuation application of a non-provisional application having an application Ser. No. 12/215,553 and a filing date of Jun. 27, 2008, now U.S. Pat. No. 7,552,905 which is a Continuation application that claims the benefit of priority under 35 U.S.C. §119 to a non-provisional application having an application Ser. No. 11/801,928 and a filing date of May 11, 2007, now U.S. Pat. No. 7,407,147 which is a divisional application that claims the benefit of priority under 35 U.S.C. §119 to a non-provisional application, having an application Ser. No. 11/192,627 and a filing date of Jul. 29, 2005, now U.S. Pat. No. 7,232,110 which is a divisional application that claims the benefit of priority under 35 U.S.C. §119 to a non-provisional application having an application Ser. No. 11/004,704 and a filing date of Dec. 3, 2004, now U.S. Pat. No. 7,028,977 which is a divisional application that claims the benefit of priority under 35 U.S.C. §119 to a non-provisional application having an application Ser. No. 10/640,693 and a filing date Aug. 14, 2003, now U.S. Pat. No. 6,845,961 which is a Continuation-In-Part application that claims the benefit of priority under 35 U.S.C. §119 to a non-provisional application having an application Ser. No. 10/377,124 and a filing date of Feb. 28, 2003 now U.S. Pat. No. 6,840,496.

BACKGROUND OF THE PRESENT INVENTION

1. Field of Invention

The present invention relates to a method for controlling volume of water used in each sensor-operated flushing cycle of a flushing system, which is capable of incorporating with an automatic flush actuation apparatus, so as to automatically complete the flushing cycle through the use of a sensor in responsive to a time duration.

2. Description of Related Arts

Manual operated toilet room flush valves for use on urinals and water closets in public restrooms are well known. As shown in FIG. 1, a conventional manual operated automatic flush actuation apparatus comprises a valve body A1 having a water inlet A11 and a water outlet A12, a diaphragm A2 having a water channel A21 communicating between the water inlet A11 and the water outlet A12, a relief valve A3 disposed at the diaphragm A2 for blocking the water flowing from the water inlet A11 to the water outlet A12 through the water channel A21, and a flush lever A4 arranged to move the relief valve A3 at a position that the water is allowed to flow to the water outlet A12 for completing the flushing operation.

For hygiene purposes, an automatic operated toilet room flush valve is developed. For example, U.S. Pat. Nos. 5,169,118 and 5,244,179 disclose a solenoid operated automatic flush valve which is battery-operated and utilizes a latching solenoid to limit power drain on the battery. Accordingly, when the infrared sensor detects the presence of a user of a urinal or toilet, the flush valve is automatically driven to open to complete the flushing operation. However, the flush valves, according to the above patents, have several common drawbacks.

The presence of the user sensed by the infrared sensor will cause the solenoid to move the diaphragm to a valve open position. It is known that the solenoid is made of a number of circular wire loops to generate a magnetic force when an electric current is passed through the wire loops. The solenoid may come in contact with water such that the solenoid may accumulate rusting particles from the water, which may remain on the solenoid. It is one of the common problems to cause a failure of operation of the flush valve. In other words, the conventional manual operated flush valve is more reliable than the solenoid operated automatic flush valve. Thus, the maintenance cost of the solenoid operated automatic flush valve is higher than that of the conventional manual operated flush valve.

In addition, the structural design of the solenoid operated automatic flush valve is different from that of the manual operated flush valve. In other words, when the flushing system is incorporated with the solenoid operated automatic flush valve, the flushing system will lose the mechanical-manual operated feature. Therefore, there is no alternative to operate the flushing cycle when the solenoid operated automatic flush valve has failed to operate.

In order to install the solenoid operated automatic flush valve into the conventional flushing system, the mechanical-manual operating mechanism of the flush valve must be totally removed, which is a waste of resources in order to incorporated with the solenoid operated automatic flush valve.

The configuration of the solenoid operated automatic flush valve is complicated, wherein once the solenoid is broken or the battery is dead, the facility should call a technician to open an outer cover and disassemble an inner cover for the replacement of the solenoid or the battery. Due to the complicated structure of the solenoid operated automatic flush valve, the solenoid operated automatic flush valve requires a skilled technician to replace the broken solenoid and/or even replace the battery, which may further increase the maintenance cost of the infrared operated automatic flush valve.

According to the U.S. Pat. No. 6,840,496, filed on Feb. 28, 2003, owned by the same inventors of the present invention, it disclosed an automatic flush actuation apparatus for automatically completing a flushing cycle through the use of a sensor.

U.S. Pat. No. 6,840,496 disclosed the system comprising the CPU 44 for sensing a presence of a user of the flushing system 1, wherein the CPU 44 is electrically connected with the power generator 43 to drive the actuator 45 to move the relief valve 30 between the auto-operated closed position and the auto-operated opened position. In other words, when the CPU 44 detects a presence of the user, the power generator 43 is automatically activated for starting the flushing cycle.

U.S. Pat. No. 6,840,496 also taught the relief valve 30 normally retained at the auto-operated closed position that the relief valve 30 is sealedly closed for blocking the water passing to the water outlet 112 at the auto-operated closed position. When the relief valve 30 is moved to an opened position by the actuator 45, the relief valve 30 is opened for releasing the water pressure within the water chamber 113 to allow the water to passing to the water outlet 112. Therefore, the relief valve 30 is arranged to complete the flushing cycle from the auto-operated closed position to opened position back to the auto-operated closed position via movement of the relief valve 30 controlled by the CPU 44.

According to the U.S. Pat. No. 6,840,496, the sensor-operated flushing cycle of the flushing system 1 is controlled by the rotation of the actuator 45, which is driven by the power generator 43 controlled and electrically connected to the CPU 44. Once the driven end portion 451 of the actuator is rotated back to its original position, the relief valve 30 is moved to sealedly sit on the valve member 20 to close the water passage 31, so as to stop and complete the flushing cycle.

Therefore, the U.S. Pat. No. 6,840,496 also indicated that the CPU 44 comprises a control processor 441. The control processor 441 is a control circuitry to control the configuration of the flushing cycle, wherein the control processor 441 is adapted to control the time of the flushing cycle, the water volume for each flushing cycle, the detecting range of the sensor 442, and the motion of the electric motor of the power generator 43. Therefore, the CPU 44 is able to adjustably control the configuration of flushing cycle.

U.S. Pat. No. 6,840,496 further disclosed that the volume of water used in one flushing cycle can be controlled by the power generator 43 through the CPU 44 in responsive to the rotational speed of the actuator 45. The volume of water used in each flushing cycle can be adjustably controlled by controlling the rotational cycle of the actuator 45, i.e. how long the actuator 45 drives the relief valve 30 to stay in the opened position. In other words, the water volume of each flushing cycle will be increased when the CPU 44 delays the rotational driving time of the actuator 45. Therefore, the water volume of each flushing cycle can be selectively adjusted in responsive to the presence of the user by configuring the corresponding setting of the CPU 44 and the power generator 43.

SUMMARY OF THE PRESENT INVENTION

A main object of the present invention is to provide a method for controlling a volume of water used in each sensor-operated flushing cycle of a flushing system comprising an automatic flush actuation apparatus, wherein the volume of water is controlled by a CPU of the automatic flush actuation apparatus via a sensor in responsive to a period of time duration, such as a presence duration and/or absent duration of a user.

Another object of the present invention is to provide the method for controlling the volume of water, wherein the automatic flush actuation apparatus comprises two different flushing modes with different volumes of water used in the flushing cycle.

Another object of the present invention is to provide the method for controlling the volume of water, wherein the two flushing modes are a urinal mode and a toilet mode respectively. The urinal mode has a relatively lesser volume of water than the toilet mode.

Another object of the present invention is to provide the method for controlling the volume of water, wherein the toilet mode further has a high volume toilet mode and a low volume toilet mode. The high volume toilet mode is configured with relatively higher volume of water in responsive to longer time duration of presence, and the lower volume toilet mode is responsive to shorter time duration of presence.

Another object of the present invention is to provide the method for controlling the volume of water, wherein the automatic flush actuation apparatus comprises a relief valve controlled by the CPU for moving between an auto-operated closed position and opened position to complete and control the flushing cycle.

Another object of the present invention is to provide the method for controlling the volume of water, wherein volume of water of the flushing cycle controlled by the CPU is in responsive to the presence duration of the user, wherein the presence duration is proportional to the volume of water having a minimum and maximum volume.

Another object of the present invention is to provide the method for controlling the volume of water, wherein the present duration is detected via the sensor in a detecting range, wherein the sensor detects an initial time and an end time to define the presence duration, so as to control the volume of water by the CPU, which is electrically connecting to the sensor.

Another object of the present invention is to provide the method for controlling the volume of water, wherein a control reference panel is provided for selectively configuring to control the time of the flushing cycle, the water volume for each of the flushing cycle, a detecting range of the sensor for detecting the presence duration of the user of the flushing system, and a motion of a power generator.

Another main object of the present invention is to provide an automatic flush actuation apparatus which is capable of incorporating with a conventional manual flushing system, such as urinal and water closet, so as to automatically operate the flush valve through the use of a sensor.

Another object of the present invention is to provide an automatic flush actuation apparatus without altering the original structural design of the manual operated flush valve in order to incorporate with the present invention. Therefore, the user is able to mechanically-manually operate the flushing cycle for the flushing system if the automatic operation system is not functioning properly.

Another object of the present invention is to provide an automatic flush actuation apparatus which is reliable and that can be easily installed and maintained.

Another object of the present invention is to provide an automatic flush actuation apparatus, wherein a covering cap has a battery opening that allows a power source exposing to outside. Therefore, any individual is able to simply replace the power source without detaching the covering cap from the flushing system, so as to reduce the maintenance cost of the present invention.

Another object of the present invention is to provide an automatic flush actuation apparatus, wherein the covering cap further has a sensor opening that allows a CPU exposing to outside. Therefore, any individual is able to make adjustments via the sensor switch through the CPU opening without detaching the covering cap from the flushing system.

Another object of the present invention is to provide an automatic flush actuation apparatus, which is powered by an electric motor so as to avoid water damage and to enhance performance and reliability.

Another object of the present invention is to provide an automatic flush actuation apparatus, which provides an economic and efficient solution for incorporating with the conventional manual operated flushing system in a simple and economical way.

Accordingly, in order to accomplish the above objects, the present invention provides a method for controlling the volume of water used for the sensor-operated flushing cycle of a flushing system comprising an automatic flush actuation apparatus, comprising the steps of:

(a) detecting a presence duration of a user by a CPU of the automatic flush actuation apparatus;

(b) starting the flushing cycle by allowing water flowing from a water inlet to a water outlet through a flush channel of the flushing system through the automatic flush actuation apparatus;

(c) adjustably controlling a volume of water used in the flushing cycle for the flushing system by controlling a time duration of the flushing cycle; and (d) completing the flushing cycle in responsive to the presence duration of the user to stop water passing to the water outlet by closing the flush channel until the flushing cycle is started again.

Accordingly, in order to accomplish the above objects, the present invention also provides an automatic actuation apparatus for a valve body having a water inlet and a water outlet, comprising:

a valve member adapted for sealedly disposed between the water inlet and the water outlet to control water flowing from the water inlet to the water outlet;

a powering assembly comprising a power generator, a relief valve and an actuator which is driven by the power generator to move the relief valve between an auto-operated closed position and an auto-operated opened position, at the auto-operated closed position, the relief valve blocking water passing to the water outlet, at the auto-operated opened position, the relief valve allowing the water passing to the water outlet; and a control processor for adjustably controlling a time duration of each flushing cycle of the flushing system in responsive to a presence duration of a user, so as to control water volume for each flushing cycle.

These and other objectives, features, and advantages of the present invention will become apparent from the following detailed description, the accompanying drawings, and the appended claims.

BRIEF DESCRIPTION OF THE DRAWINGS

FIG. 9 is a table illustrating the flushing modes of the flushing system according to the preferred embodiment of the present invention, illustrating the timer sequence for each of the flushing modes.

FIG. 10B illustrates the switch adjustment reference chart of the control reference panel according to the preferred embodiment of the present invention.

FIG. 10C illustrates the switch adjustment guide of the control reference panel according to the preferred embodiment of the present invention.

DETAILED DESCRIPTION OF THE PREFERRED EMBODIMENT

Figure 1:
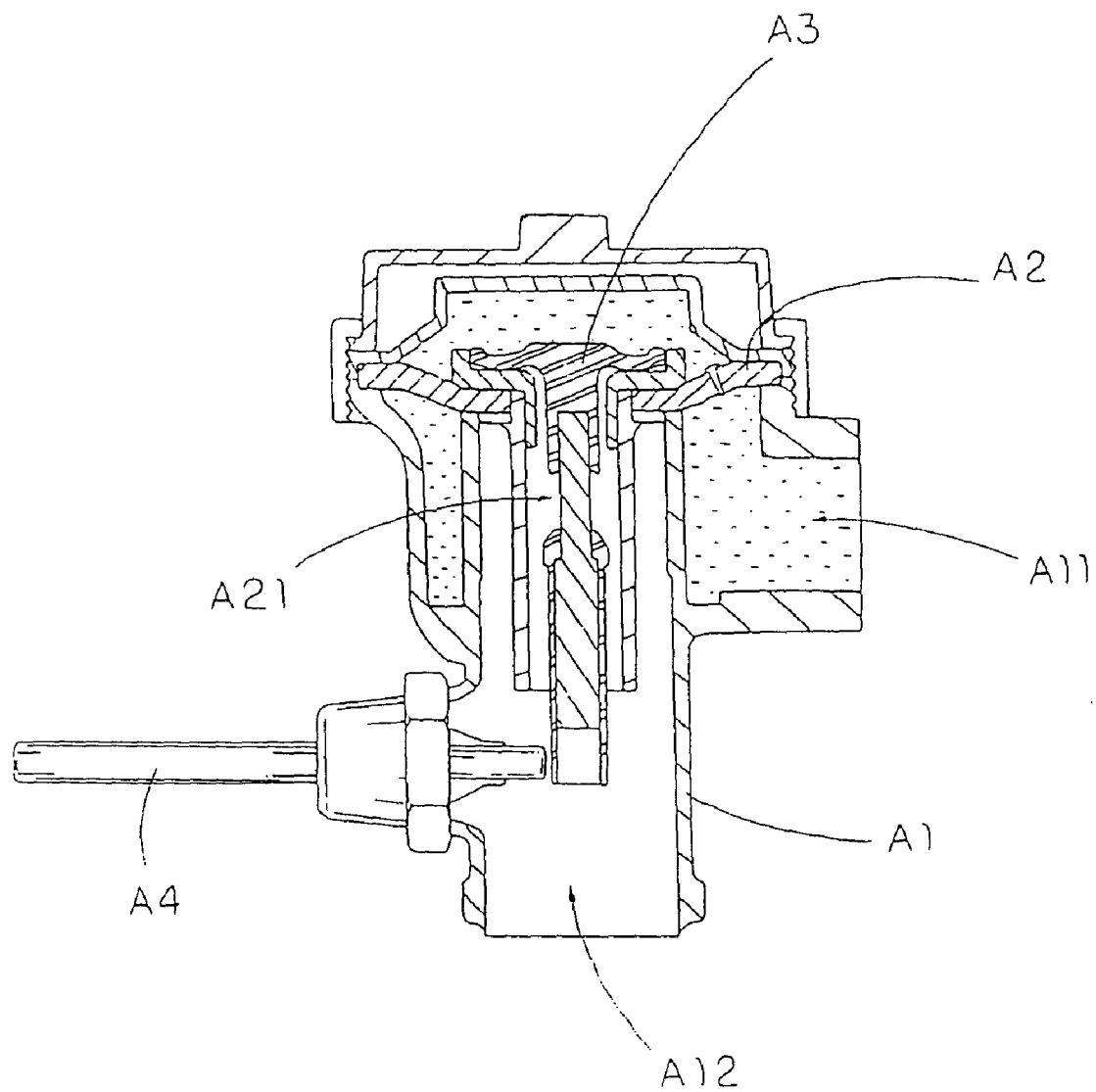
FIG. 1 is a sectional view of a conventional manual operated flushing system.
Figure 2:
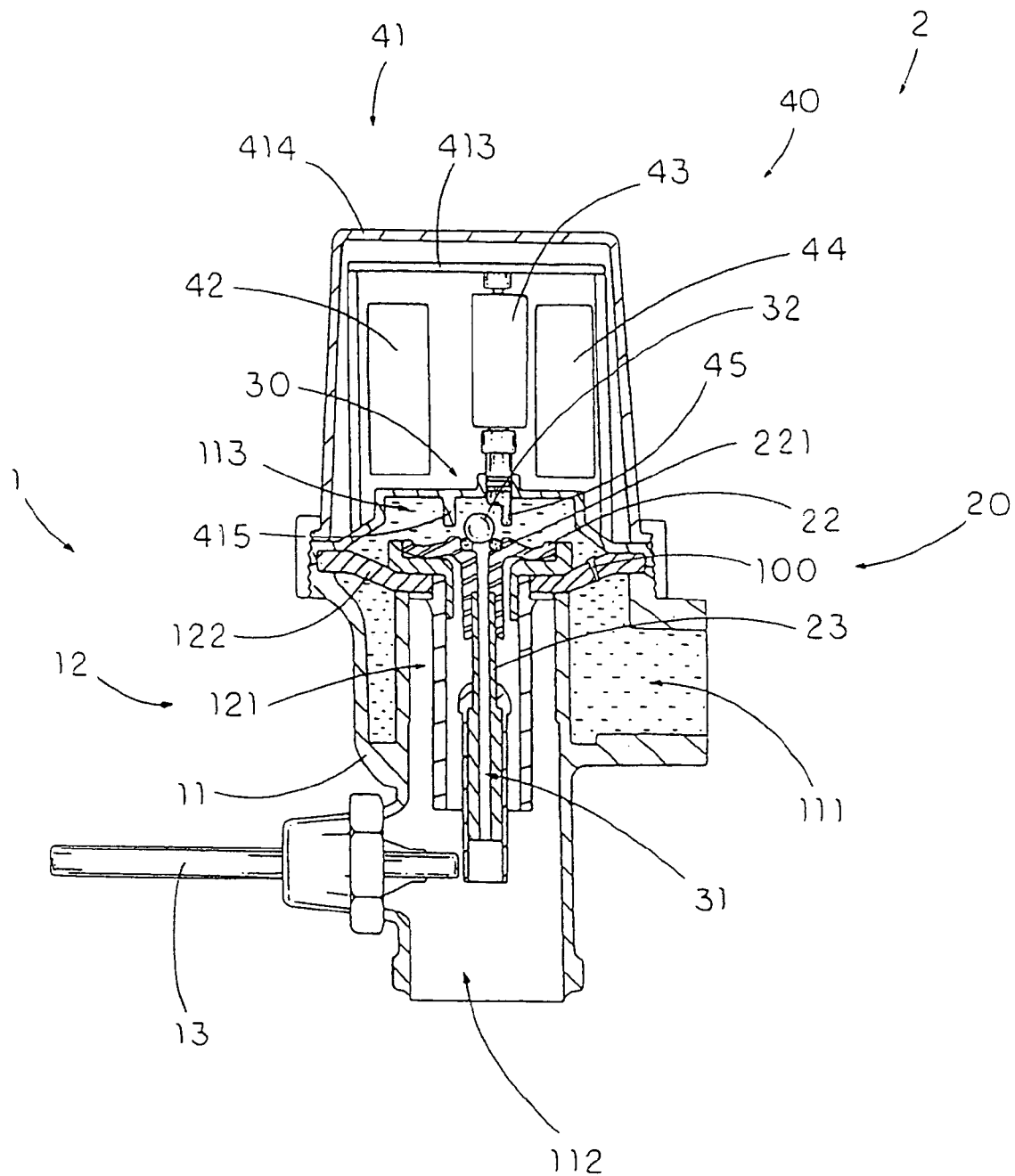
FIG. 2 is a sectional view of an automatic flush actuation apparatus according to a preferred embodiment of the present invention.

Referring to FIG. 2 of the drawings, an automatic flush actuation apparatus 2 for a flushing system 1 according to a preferred embodiment of the present invention is illustrated, wherein the automatic flush actuation apparatus 2 is capable of incorporating with a conventional manual operated fluid flow system such as a flushing system to achieve both manual and automatic operations to start a flushing cycle of the flushing system 1.

The flushing system 1, such as the conventional manual operated flushing system, comprises a valve body 11 having a water inlet 111, a water outlet 112 and a water chamber 113 that is normally sealed between the water inlet 111 and the water outlet 112, a valve seat 12, having a flush channel 121, disposed between the water inlet 111 and the water outlet 112 to block water flowing from the water inlet 111 to the water outlet 112, and a flush lever 13 coupled with the valve body 11.

The valve seat 12 comprises a diaphragm 122, having a bleed hole 100, sealedly disposed in the valve body 11 in a movable manner to define the water chamber 113 above the diaphragm 122 to communicate between the water inlet 111 and the water outlet 112. In other words, once the water within the water chamber 113 is released to reduce the water pressure therein, the diaphragm 122 is forced to bend upwardly so that the water is capable of passing from the water inlet 111 to the water outlet 112 to complete the flushing cycle of the flushing system.

Accordingly, the water is flowed into the water chamber 113 from the water inlet 111 through the bleed hole 100 on the diaphragm 122 in such a manner that the water within the water chamber 113 provides a predetermined water pressure against the diaphragm 122 to normally block the water flowing to the water outlet 112.

The automatic flush actuation apparatus 2 comprises a valve member 20 and a sensor-operated powering assembly 40.

The valve member 20 is adapted for being disposed at the valve seat 12 to control the water flowing from the water inlet 111 to the water outlet 112. The valve member 20 is capable of being moved by the flush lever 13 between a manual-operated closed position and a manual-operated opened position, wherein at the manual-operated closed position, the valve member 20 is arranged for sealedly sitting at the valve seat 12 to block the water passing to the water outlet 112, and at the manual-operated opened position, the valve member 20 is moved to an opened position for releasing the water pressure within the water chamber 113 through the flush channel 121 so as to allow the water passing from the water inlet 111 to the water outlet 112.

Figure 5:
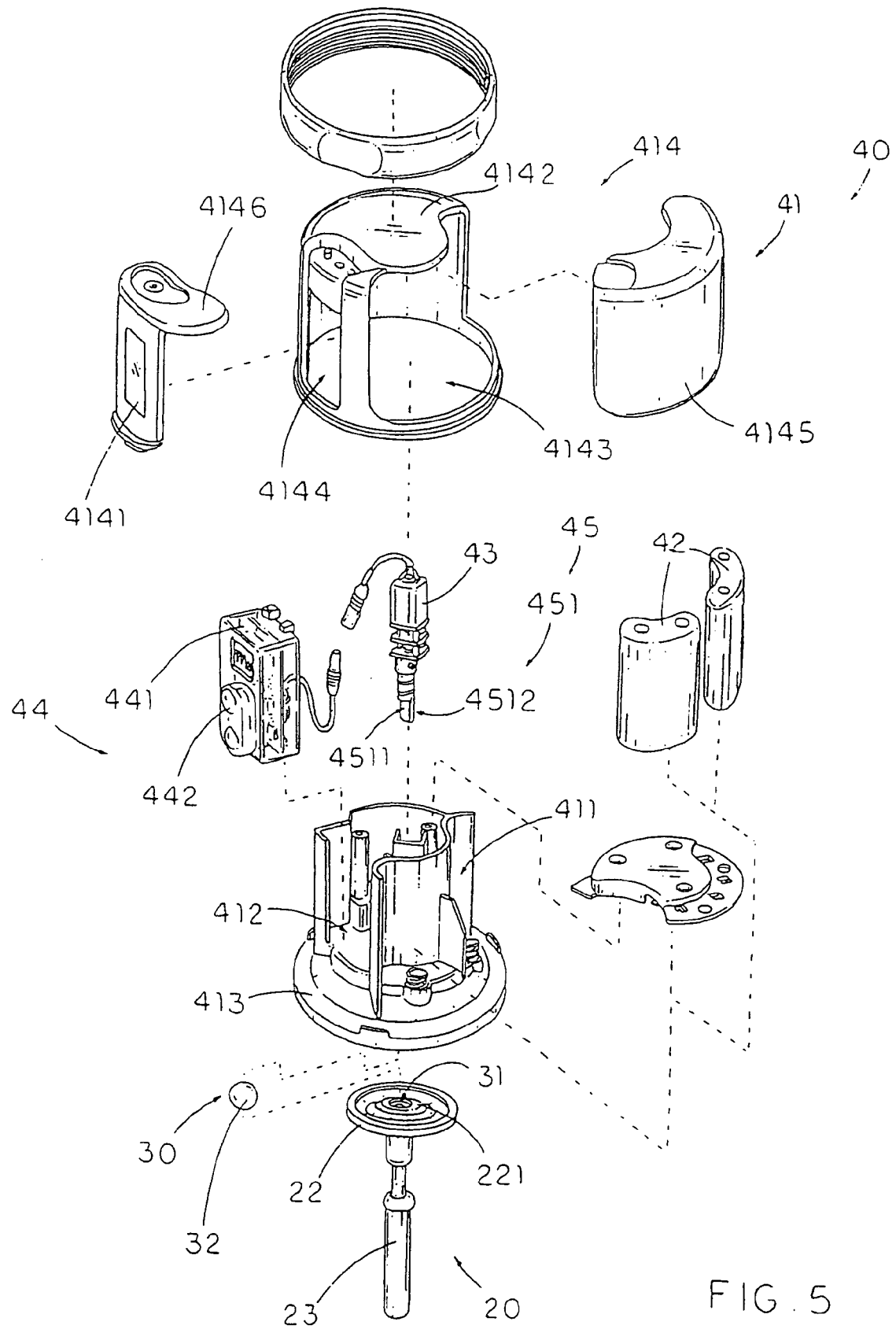
FIG. 5 is an exploded perspective view of a sensor-operated powering device of the automatic flush actuation apparatus according to the above preferred embodiment of the present invention.

As shown in FIGS. 2 and 5, the sensor-operated powering assembly 40 comprises a housing 41, which is adapted for mounting on the valve body 11, having a power source compartment 411 and a CPU cavity 412, a power source 42 replaceably received in the power source compartment 411, a power generator 43 electrically connected to the CPU 44, and the CPU 44 which is received in the CPU cavity 412 of the housing 41, electrically connected with the power source 42 for sensing a presence of a user of the flushing system 1, so as to active the power generator 43.

The sensor-operated powering assembly 40 further comprises a relief valve 30 provided at the valve member 20 for controlling the water flowing from the water inlet 111 to the water outlet 112 through the water chamber 113 and an actuator 45 driven by the power generator 43 to move the relief valve 30 between an auto-operated closed position and an auto-operated opened position.

Accordingly, at the auto-operated closed position, the relief valve 30 is sealedly closed for blocking the water passing to the water outlet 112, and at the auto-operated opened position, the relief valve 30 is moved to an opened position by the actuator 45 for releasing the water pressure within the water chamber 113 to allow the water passing to the water outlet 112.

According to the preferred embodiment, the valve member 20 comprises a sealing platform 22 arranged for sealedly supporting on the diaphragm 122 of the valve seat 12 to normally close the flush channel 121 and a valve controlling shaft 23 downwardly extended from the sealing platform 22 for communicating with the flush lever 13 within the flush channel 121.

Figure 3A:
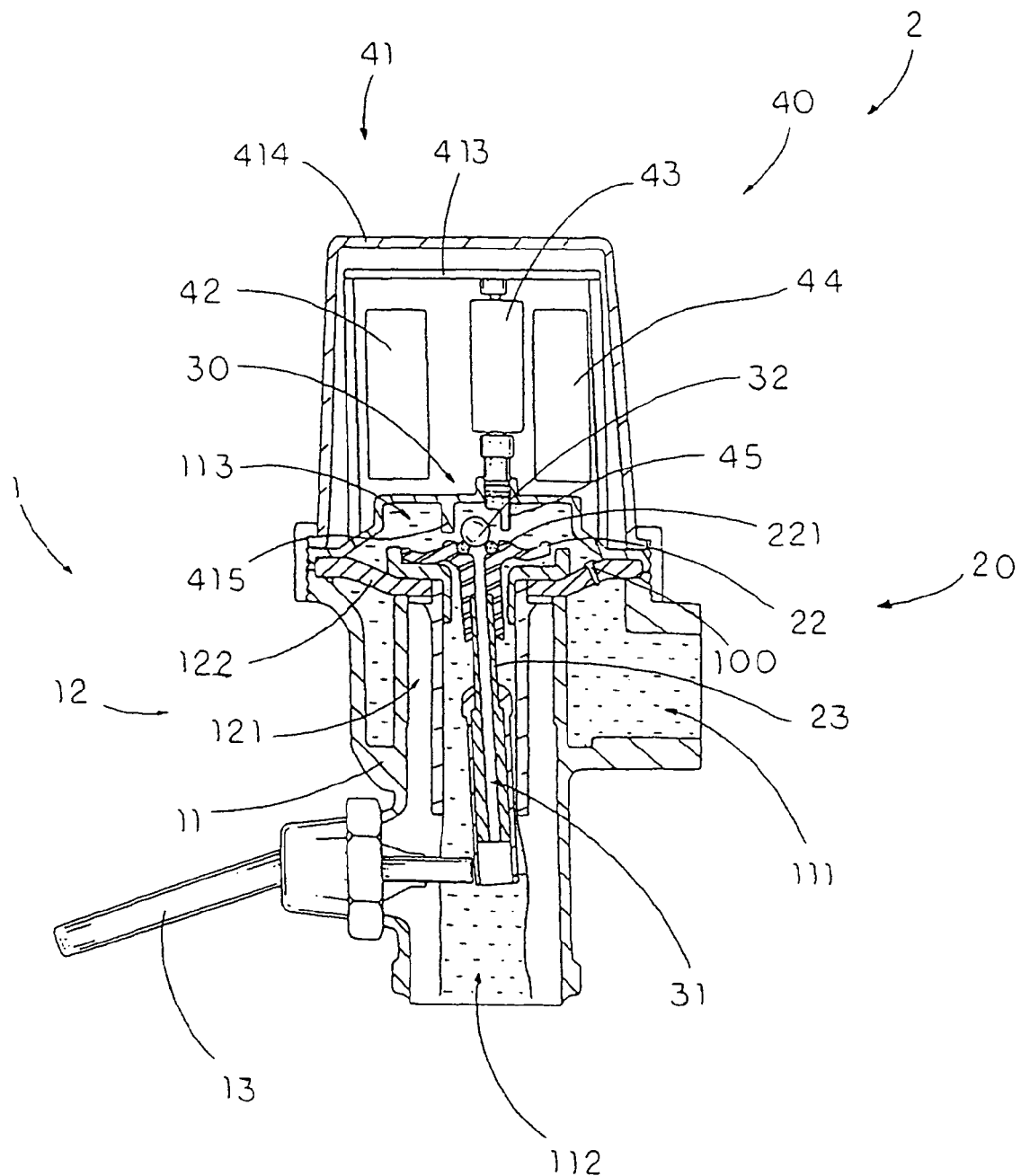
FIGS. 3A and 3B illustrate a manual operation of the flushing cycle for the automatic flush actuation apparatus according to the above preferred embodiment of the present invention.
Figure 3B:
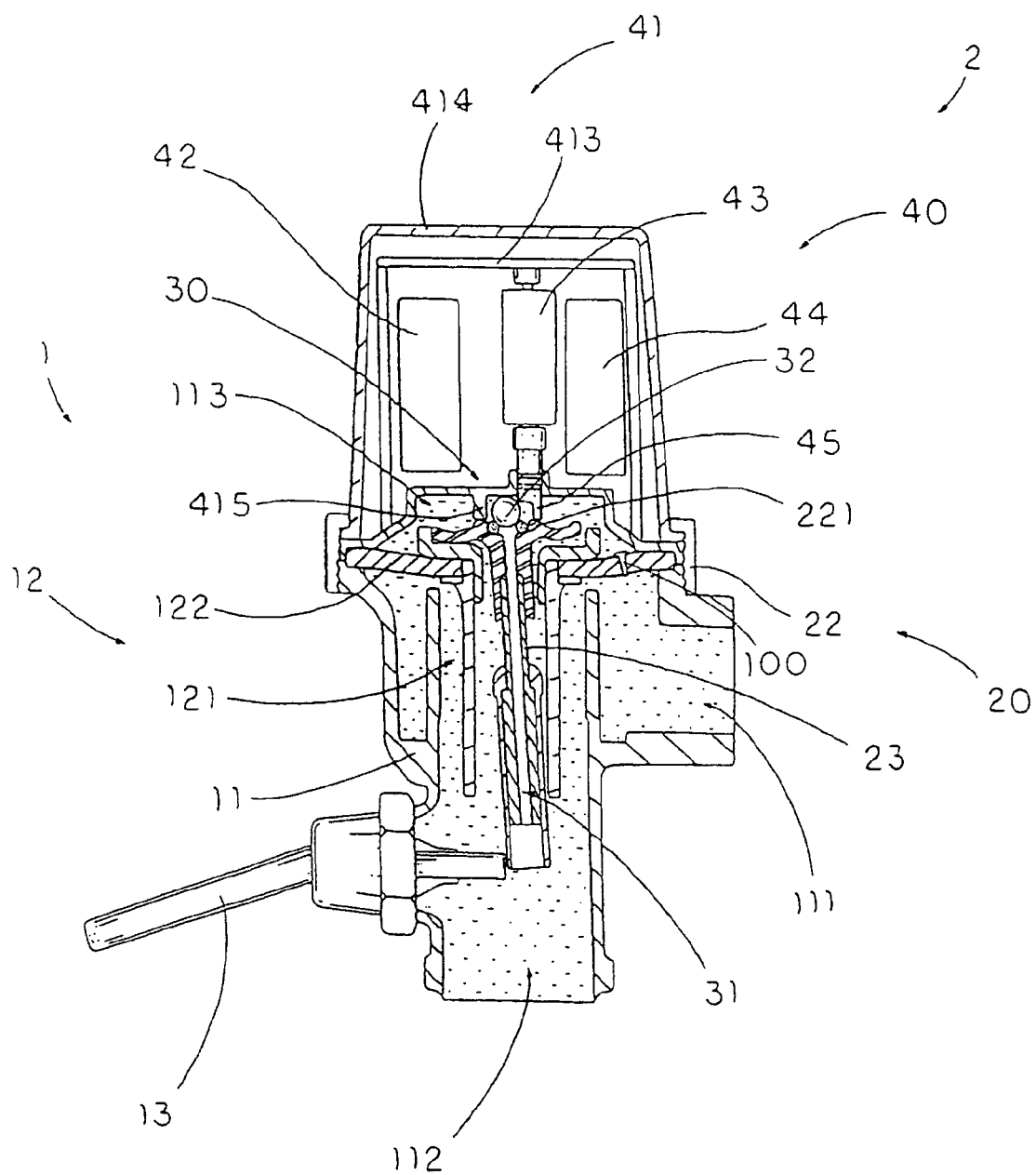

As shown in FIG. 3A, by actuating the flush lever 13, the valve controlling shaft 23 is pushed to drive the sealing platform 22 at a position offset with respect to the diaphragm 122 such that the water within the water chamber 113 is allowed to flow out through the flush channel 121 and release the water pressure within the water chamber 113 because the amount of water flowing out through the flush channel 121 is much larger than the amount of water flowing in through the bleed hole 100. Thus, when the water pressure within the water chamber 113 reduces, the diaphragm 122 is pushed upwardly for allowing the water passing to the water outlet 112, so as to start the flushing cycle of the flushing system 1 manually as the conventional manual-operated flushing system, as shown in FIG. 3B.

Once the flush lever 13 is returned back to its original position, the sealing platform 22 is forced to sealedly sit on the diaphragm 122 due to the water pressure so as to sealedly close the flush channel 121. Therefore, the diaphragm 122 is dropped down by refilling the water back into the water chamber 113 to increase the water pressure therein so as to sealedly close the water outlet 112 to stop the water passing thereto. It is worth to mention that since the sealing platform 22 is normally sealed on the diaphragm 122, no water is allowed to flow through the flush channel 121 to the water outlet 112 until the flushing cycle is started.

The relief valve 30 has a water passage 31 axially extended along the valve member 20 for communicating the water chamber 113 with the water outlet 112, and a valve stopper 32 disposed on the valve member 20 to normally close the water passage 31 for controlling the water flowing from the water inlet 111 to the water outlet 112.

As shown in FIG. 2, the water passage 31 is coaxially extended from the sealing platform 22 to a bottom end of the valve controlling shaft 23 for communicating the water chamber 113 with the water outlet 112.

The valve stopper 32, having a ball-shape, sits on the sealing platform 22 at an opening of the water passage 31 to normally close the water passage 31 for blocking the water pressure releasing from the water chamber 113. Accordingly, the sealing platform 22 has a circular retaining seat 221 protruding upwardly around the opening of the water passage 31 wherein the valve stopper 32 is disposed at the retaining seat 221 of the valve member 20 so as to hold the valve stopper 32 in position. It is worth to mention that when the valve member 20 is moved between the manual-operated closed position and the manual-operated opened position, the valve stopper 32 remains at the opening of the water passage 31 to block the water passing the water outlet 112.

As shown in FIG. 5, the housing 41 comprises a supporting frame 413 supported above the valve stopper 32 and a valve cap 414, having a transparent window 4141, adapted for detachably mounting on the valve body 11 to protectively enclose the supporting frame 413, wherein the power source 42, the power generator 43, and the CPU 44 are supported by the supporting frame 413 and enclosed by the valve cap 414 while the CPU 44 is capable of communicating with outside through the transparent window 4141.

According to the preferred embodiment, the power source 42 comprises a battery replaceably disposed in the power source compartment 411 to electrically connect with the CPU 44. It is worth to mention that the power source 42 can be used as an AC current to electrically plug into an electric outlet for supplying electricity to the CPU 44.

The power generator 43, according to the preferred embodiment, is an electric motor electrically connected to the CPU 44 wherein the power generator 43 is actuated via the CPU 44 to drive the actuator 45 to rotate. Accordingly, the power generator 43 can be a conventional solenoid electrically connected to the CPU 44 to drive the actuator 45 so as to move the valve stopper 32 between the auto-operated closed position and the auto-operated opened position. It is worth to mention that the electric motor is more reliable than the solenoid because the electric motor provides simple mechanical work rather than using the magnetic force, so as to minimize the failure operation of the power generator 43 and to reduce the maintenance cost of the present invention.

The CPU 44 comprises a control processor 441 supported in the housing 41 and a sensor 442 which is electrically connected to the control processor 441 and aligned with the transparent window 4141 of the valve cap 414. Accordingly, the sensor 442 is an infrared sensor arranged to detect the presence of the user by means of infrared signal in such a manner that when the sensor 442 sends an infrared signal through the transparent window 4141 for detecting the presence of the user of the flushing system, the control processor 441 activates the power generator 43 to actuate valve stopper 32 to open the relief valve 30.

In addition, the control processor 441 is a control circuitry to control the configuration of the flushing cycle wherein the control processor 441 is adapted to control the time of the flushing cycle, the water volume for each flushing cycle, the detecting range of the sensor 442, and the motion of the electric motor of the power generator 43. Thus, a default configuration is preset in the control processor 441 such that the automatic flush actuation apparatus of the present invention is capable of returning to its original settings through the control processor 441. It is worth to mention that the control processor 441 also controls the power of the power source 42 wherein when there is no sufficient power to actuate the power generator 43, the control processor 441 will control the relief valve 30 to remain in the closed position. In other words, only the manual operation of the flush lever 13 is capable of starting the flushing cycle when the control processor 441 stops the actuation of the relief valve 30.

The actuator 45 is rotatably extended from the power generator 43 wherein the actuator 45 has a driving end portion 451 downwardly and rotatably extended from a bottom side of the supporting frame 413 to contact with the valve stopper 32. Accordingly, the driving end portion 451 of the actuator 45, having a semi-circular cross section, has a flat contacting surface 4511 and a curved contacting surface 4512, wherein the driving end portion 451 of the actuator 45 is arranged to be driven to rotate via the power generator 43 to move the valve stopper 32 at the auto-operated closed position that the valve stopper 32 is contacted with the flat contacting surface 4511 of the actuator 45 to retain the valve stopper 32 at the opening of the water passage 31 for blocking the water passing to the water outlet 112 as shown in FIG. 2, and to move the valve stopper 32 at the auto-operated opened position that the valve stopper 32 is contacted with the curved contacting surface 4512 of the actuator 45 to move the valve stopper 32 to offset the opening of the water passage 31 for allowing the water passing to the water outlet, as shown in FIG. 4A.

Figure 4A:
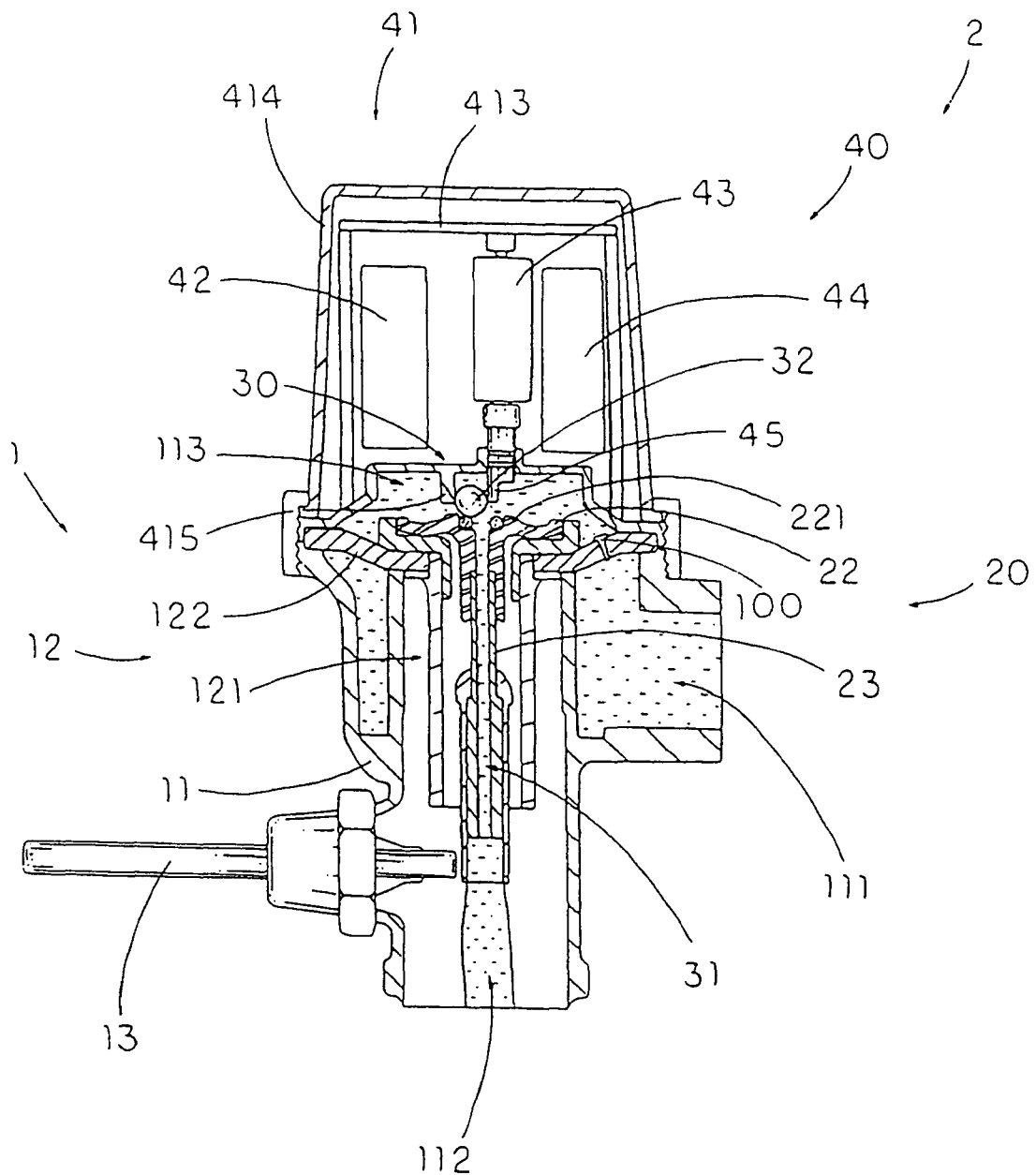
FIGS. 4A and 4B illustrate an automatic sensor operation of the flushing cycle for the automatic flush actuation apparatus according to the above preferred embodiment of the present invention.
Figure 4B:
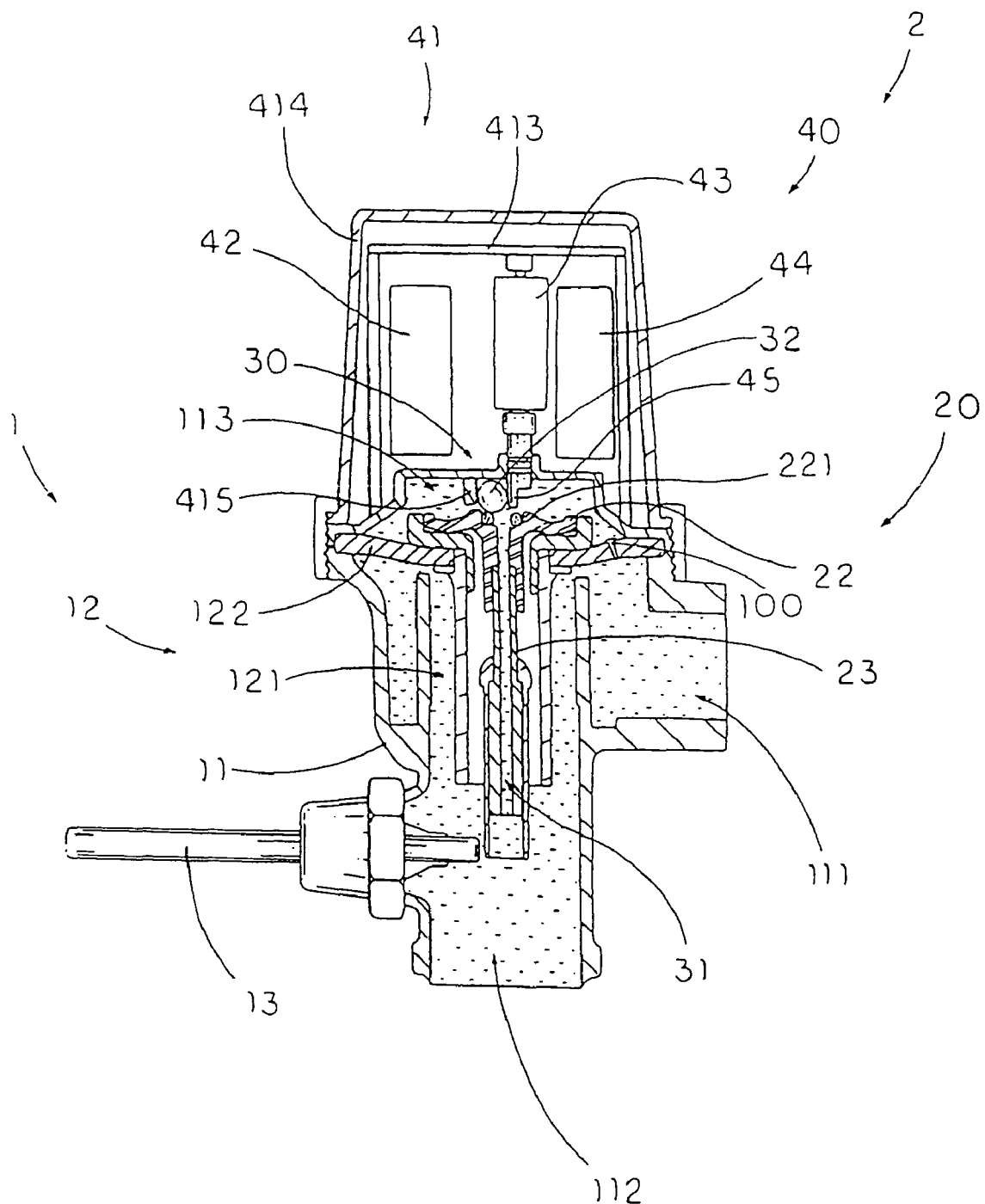

It is worth to mention that when the actuator 45 moves the valve stopper 32 away from the opening of the water passage 31, the water within the water chamber 113 is allowed to flow out through the water passage 31 so as to reduce the water pressure within the water chamber 113, as shown in FIG. 4A. Then, the diaphragm 122 is pushed upwardly for allowing the water flowing from the water inlet 111 to the water outlet 112, as shown in FIG. 4B. Once the valve stopper 32 is moved back into its original position to close the water passage 31, the diaphragm 122 is dropped down by refilling the water back into the water chamber 113 to increase the water pressure therein so as to sealedly close the water outlet 112 to stop the water passing thereto.

The sensor-operated flushing cycle of the flushing system 1 is controlled by the rotation of the actuator 45. Once the driving end portion 451 of the actuator 45 is rotated back to its original position, i.e. valve stopper 32 is contacted with the flat contacting surface 4511 of the actuator 45, the valve stopper 32 is forced to sealedly sit on the valve member 20 by means of water pressure to close the water passage 31. Therefore, the diaphragm 122 is dropped down by pressure to sealedly close the water outlet 112 to stop the water passing thereto.

It is worth to mention that the volume of water used in one flushing cycle for the flushing system 1 can be controlled by the power generator 43 through the CPU 44 to control the rotational speed of the actuator 45. The volume of water used in each flushing cycle can be adjustably controlled by controlling the rotational cycle of the actuator 45, i.e. how long the actuator 45 drives the valve stopper 32 to stay in the opened position and the closed position. In other words, the water volume of each flushing cycle will be increased when the CPU 44 delays the rotational driving time of the actuator 45.

Accordingly, when the valve stopper 32 is moved between the auto-operated closed position and the auto-operated opened position, the valve member 20 is remained at its manual-operated closed position. Since the manual operation and the sensor operation employ with different water pathways, i.e. the flush channel 121 and the water passage 31, the manual and sensor operations do not interrupt with each other and function individually.

Therefore, to start the flushing cycle of the flushing system, the individual is able to either manually operate the flush lever 13 to move the valve member 20 to an offset position so as to release the water pressure through the flush channel 121 or automatically operate the CPU 44 to move the valve stopper 32 to an offset position so that the water pressure is allowed to be released through the water passage 31. In other words, even though the sensor-operated powering assembly 40 fails to operate due to the battery, the individual is still able to complete the flushing cycle for the flushing system manually.

In order to securely hold the valve stopper 32 in position, the supporting frame 413 of the housing 41 further comprises a locating ring 415 integrally and downwardly protruded from the bottom side of the supporting frame 413 to coaxially align with the water passage 31 so as to form as a boundary for the valve stopper 32 to move within the locating ring 415. In other words, the locating ring 415 limits the movement of the valve stopper 32 to prevent the valve stopper 32 from becoming dislocated on the valve member 20 and to guide the valve stopper 32 returning back to the opening of the water passage 31 after completing the flushing cycle.

As shown in FIG. 5, the valve cap 414 further comprises an outer casing 4142 having a power source opening 4143 aligned with the power source compartment 411 to expose the power source 42 to outside through the power source opening 4143 and a CPU opening 4144 aligned with the CPU cavity 412 to expose the CPU 44 to outside through the CPU opening 4144, and a power source cover 4145 detachably mounted on the outer casing 4142 to cover the power source opening 4143, wherein the transparent window 4141 is detachably mounted on the outer casing 4142 to enclose the CPU 44 within the valve cap 414.

Therefore, an individual is able to replace the power source 42 and to adjust the settings of the CPU 44 by detaching the power source cover 4145 and the transparent window 4141 respectively without removing the entire valve cap 414 so as to simplify the replacement operation and adjustment of the present invention. It is worth to mention the valve cap 414, such as the conventional cap, is securely mounted on the valve body 11 via a locking ring 400 such that the individual must use a wrench to unscrew the locking ring 400 in order to detach the valve cap 414. It is worth to mention that the locking ring 400 is arranged to sealedly mount the diaphragm 122 of the valve seat 12 on the valve body 11 to prevent water leakage thereof. However, it would be inconvenient to replace the power source 42 and to adjust the CPU 44 if the valve cap 414 must be detached from the valve body 11 and then sealedly attached back onto the valve body 11. Thus, the water may leak to the outside when the valve cap 414 is opened, especially if the valve cap 414 is not perfectly sealed onto the valve body 11.

In addition, the valve cap 414 further comprises a cover locker 4146 provided on the outer casing 4142 to securely lock up the power source cover 4145 and the transparent window 4141 to enclose the power source opening 4143 and the CPU opening 4144 respectively. It is worth to mention that the locking and unlocking operation of the cover locker 4146 is simply in comparison with the locking and unlocking operation of the valve cap 414, so as to provide a quick and easy replacement operation of the present invention.

In comparison with the conventional manual operated flushing system, the conventional manual operated flushing system can keep most of the major components, such as the valve body 11, valve seat 12 and the flush lever 13, in order to incorporate with the automatic flush actuation apparatus 2 of the present invention, so as to minimize the cost of incorporating the conventional manual operated flushing system with the automatic flush actuation apparatus 2 of the present invention.

Figure 6:
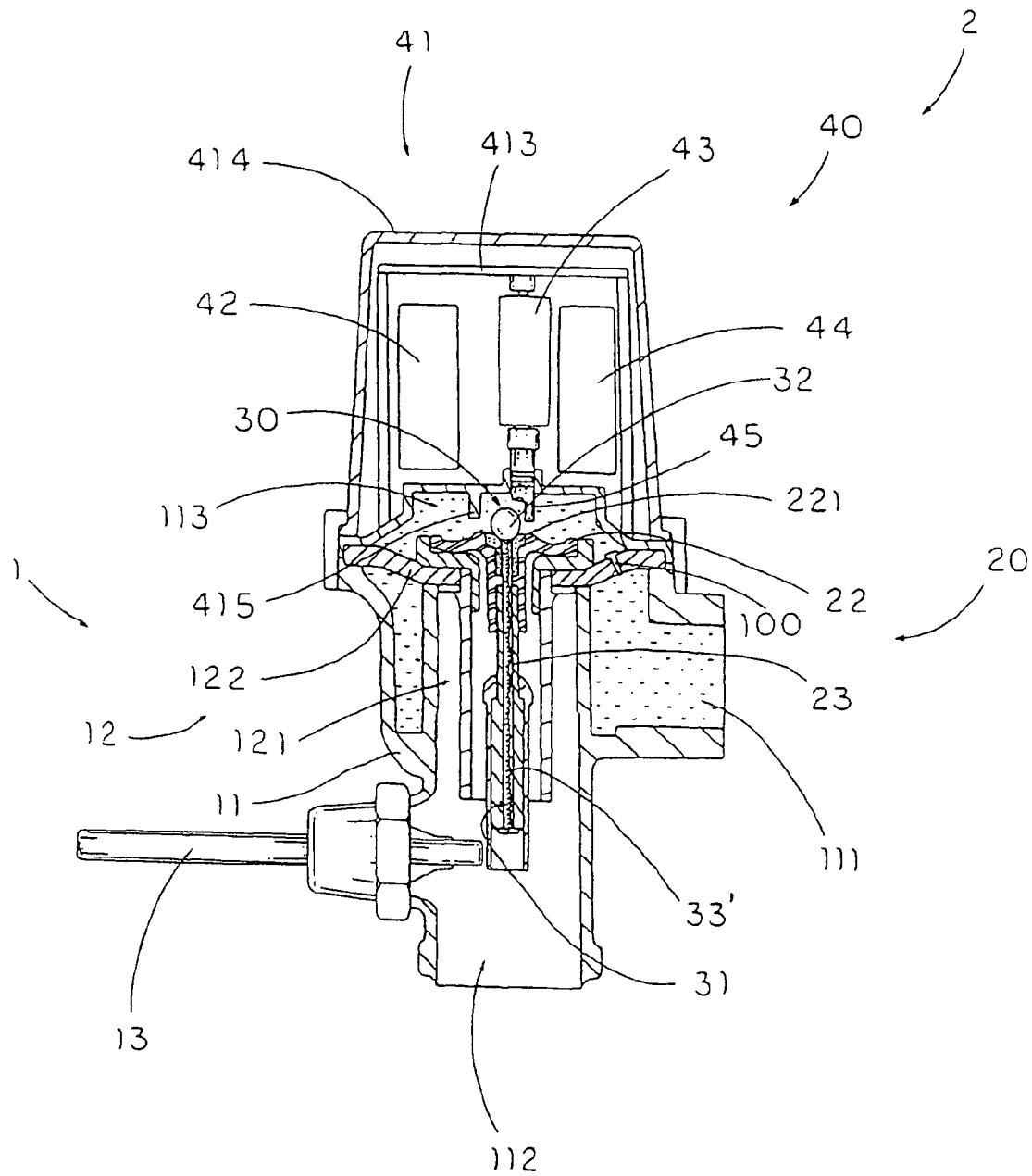
FIG. 6 illustrates an alternative mode of the relief valve of the automatic flush actuation apparatus according to the above preferred embodiment of the present invention.

FIG. 6 illustrates an alternative mode of the relief valve 30 wherein the relief valve 30 further comprises a resilient element 33' having a biasing end biasing against the valve stopper 32 so as to normally retain the valve stopper 32 at the auto-operated closed position. The resilient element 33', according to the preferred embodiment, is a compression spring disposed within the water passage 31 for applying an urging force against the valve stopper 32 so as to normally pull the valve stopper 32 to sealedly close the opening of the water passage 31. As shown in FIG. 6, the biasing end of the resilient element 33' coupled with the valve stopper 32 and an opposed affixing end coupled with a bottom end of the water passage 31 for applying the pulling force against the valve stopper 32.

Figure 7A:
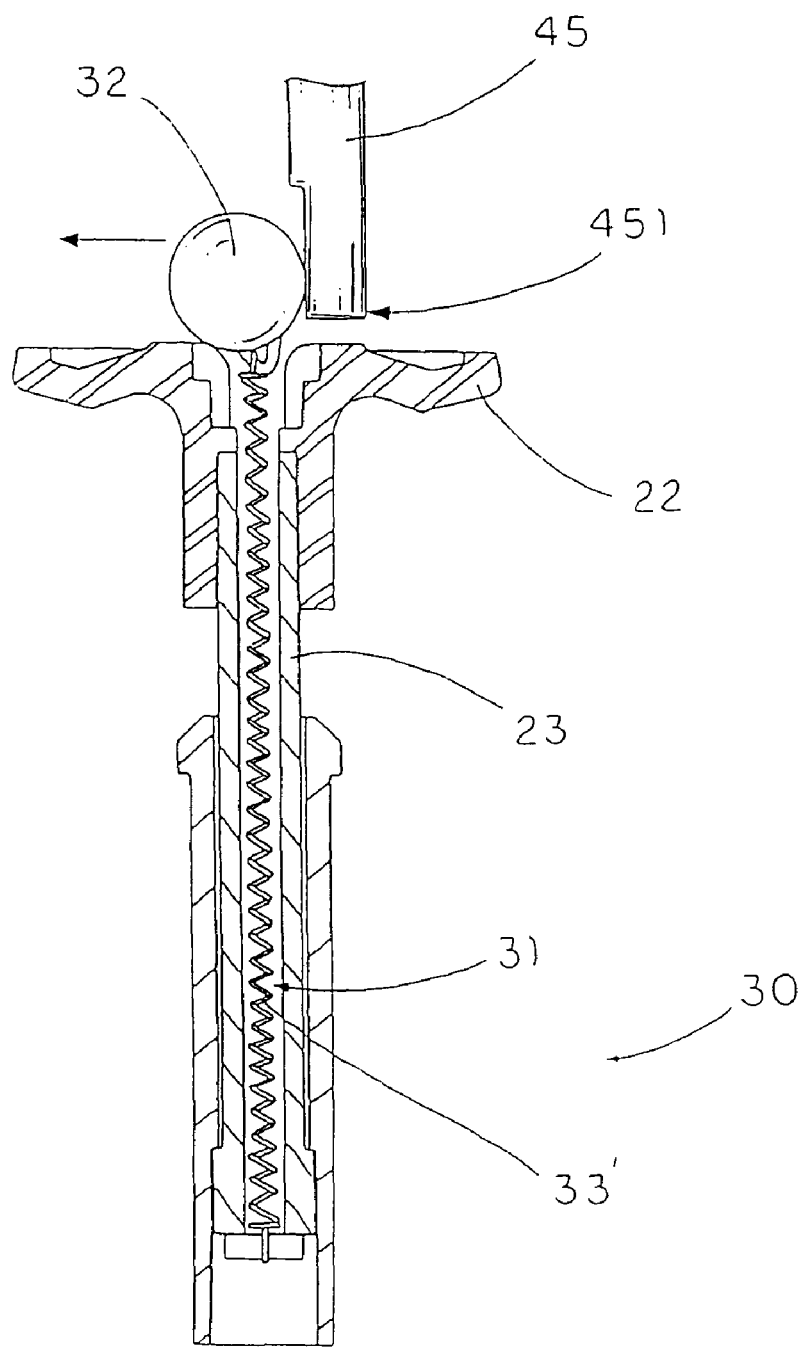
FIGS. 7A and 7B illustrate the operation of the relief valve of the alternative mode according to the above preferred embodiment of the present invention.
Figure 7B:
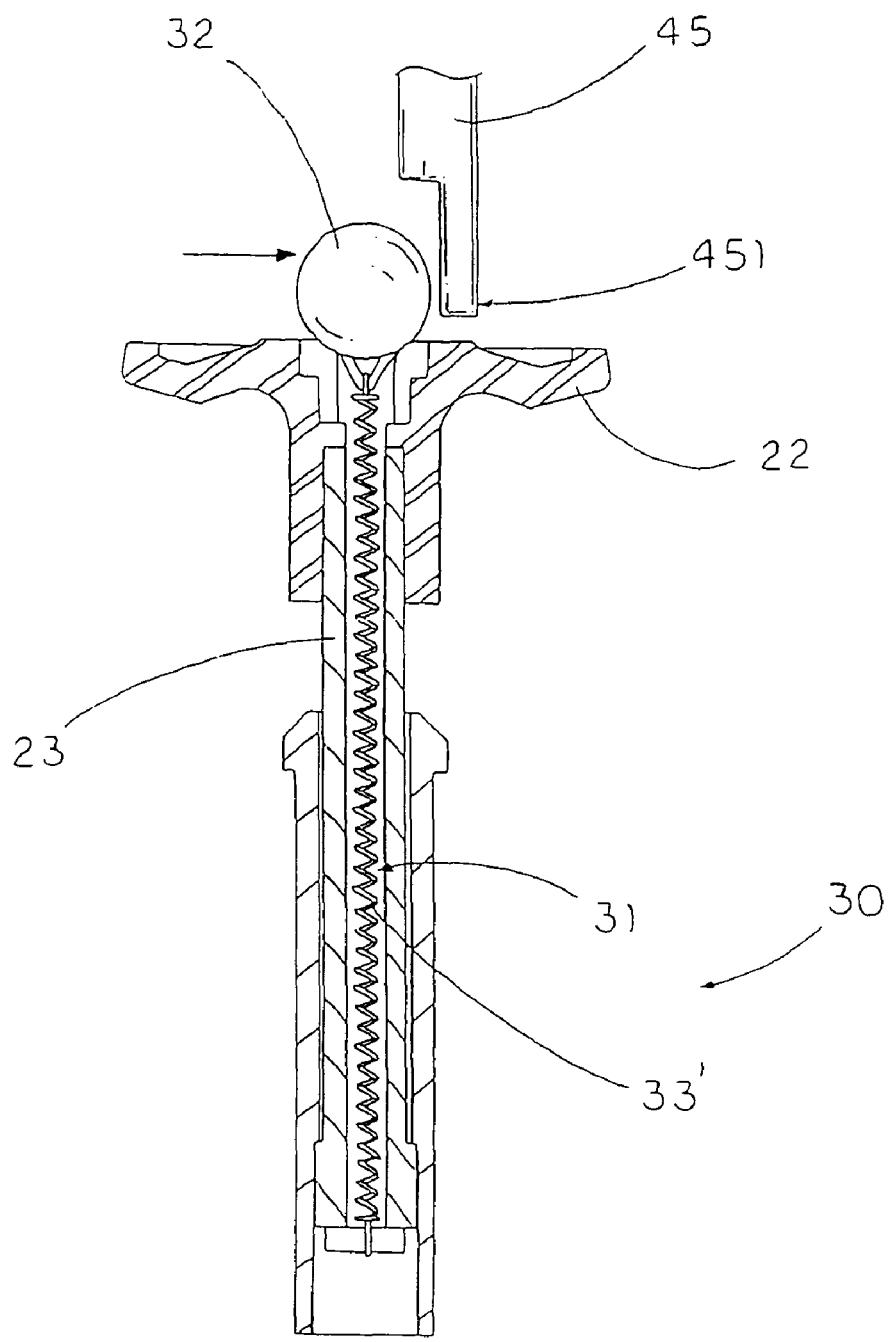
Figure 8:
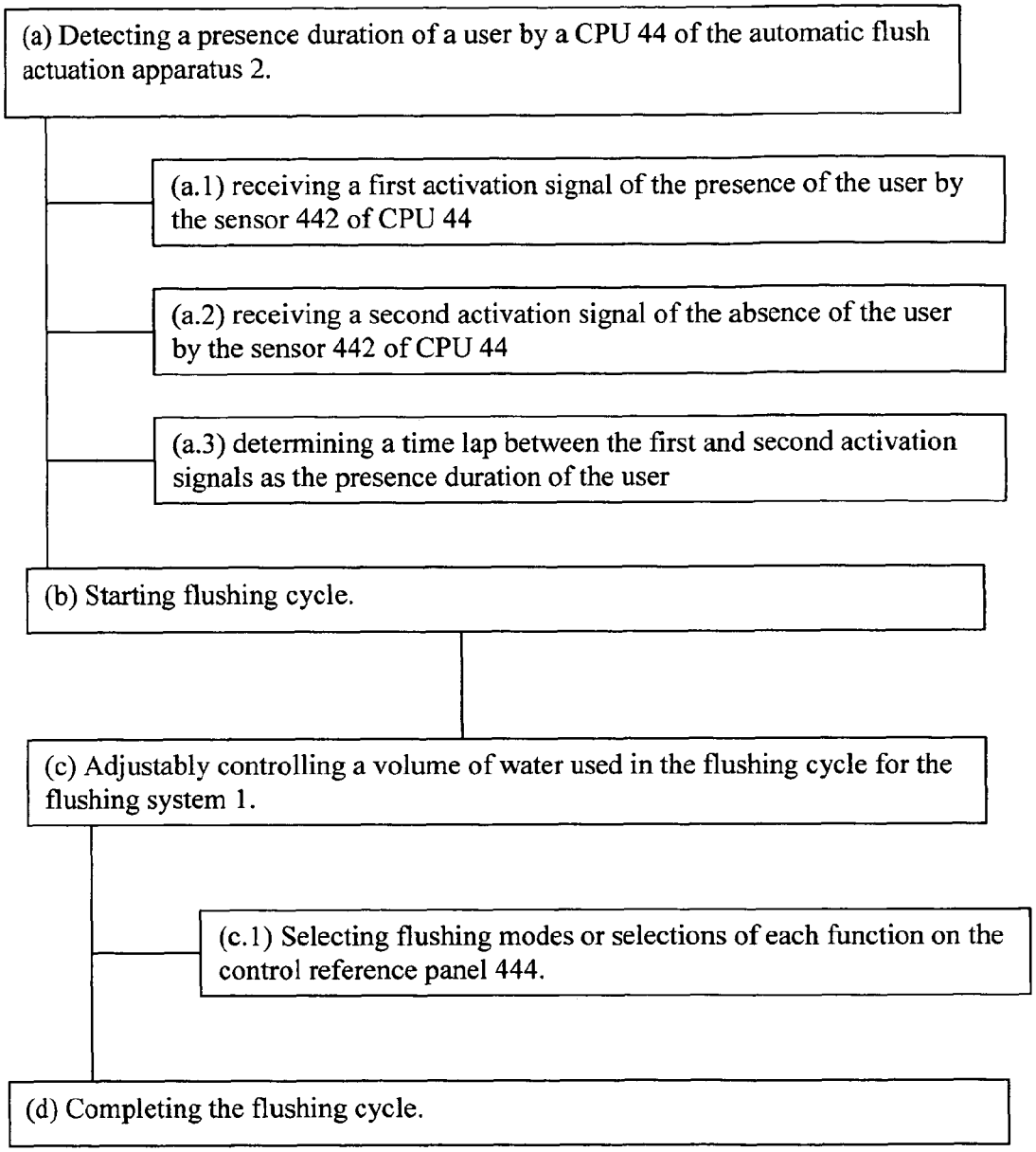
FIG. 8 is a flow chart of a method for controlling a volume of water used for a sensor-operated flushing cycle of a flushing system comprising the automatic flash actuation apparatus according to the preferred embodiment of the present invention.

As shown in FIG. 7A, when the driving end portion 451 of the actuator 45 is driven to rotate to move the valve stopper 32 to the offset position so as to allow the water to flow through the water passage 31, the resilient element 33' is forced to stretch for applying the urging pressure against the valve stopper 32. After the driving end portion 451 of the actuator 45 moves back to its original position, the resilient element 33 rebounds to its original form to pull the valve stopper 32 back on the retaining seat 221 of the sealing platform 22 for sealing the water passage 31 so as to block the water to flow therethrough, as shown in FIG. 7B. Therefore, the resilient element 33' ensures the valve stopper 32 of the relief valve 30 returning back to the auto-operated closed position after each flushing operating.

In addition, the automatic flush actuation apparatus 2 of the present invention is capable of incorporating with most conventional flushing systems to provide the sensor operation of the flushing system with or without the flush lever 13 for starting the flushing cycle. It is worth to mention that the valve member 20 can be embodied as the valve seat 12 when the automatic flush actuation apparatus 2 of the present invention is incorporated with the conventional sensor-operation flushing system.

Referring to FIGS. 8 to 11 of the drawings, the present invention further provides a method for controlling a volume of water for each flushing cycle, wherein the method of controlling volume of water used in each sensor-operated flushing cycle of the flushing system 1 via the automatic flush actuation apparatus 2 comprises the following steps.

(1) Detect the presence duration of a user by the CPU 44 of the automatic flush actuation apparatus 2.

(2) Start the flushing cycle by allowing water flowing from a water inlet 111 to a water outlet 112 through the flush channel 121 of the flushing system 1 through the automatic flush actuation apparatus.

(3) Adjustably control the volume of water used in the flushing cycle for the flushing system 1 by controlling the time duration of the flushing cycle.

(4) Complete the flushing cycle in responsive to the presence duration of the user to stop water passing to the water outlet 112 by closing the flush channel 121 until the flushing cycle is started again.

As it is mentioned above, the valve member 20 is arranged for sealedly disposed between the water inlet 111 and water outlet 112. The powering assembly 40 is operated by the sensor 442 of the CPU 44, wherein the control processor 441 of the CPU 44 is arranged for controlling the configuration of each flushing cycle, such as a time of each flushing cycle of the flushing system 1, so as to control water volume for each flushing cycle.

The control processor 441 is able to be adjusted to control the time of flushing cycle, the water volume for each flushing cycle, a detecting range of the sensor 442 for detecting presence of the user of the flushing system, and a motion of the power generator 43. The volume of water used in each flushing cycle for the flushing system 1 is controlled through the control processor 441 to control the driven speed of the actuator 45 so that the volume of water used in each flushing cycle is able to be adjustably controlled by controlling the driven speed of the actuator 45.

As it is mentioned above, the volume of water controlled by the control processor 441 is through the actuator 45 driving the relief valve 30 to stay at the auto-operated opened position, thereby the water volume of each the flushing cycle is able to be increased when the control processor delays the driving time of the actuator 45. Thus, the driving time controlled by the control processor 441 is in responsive to the presence duration of the user that detected in the step (1).

Accordingly, in the step (1), the flushing cycle starts in responsive to the presence duration of the user in front of the flushing system. As it is mentioned above, the sensor 442 of the CPU 44 is adapted for detecting the presence duration of the user is electrically connected to the control processor 441 to activate the power generator 43. Therefore, the relief valve 30 is actuated to start the flushing cycle.

According to the preferred embodiment, the control processor 441 is able to be adjusted to control the detecting range of the sensor 442 for detecting the presence of the user of the flushing system 1.

In order to detect the presence duration of the user, the step (1) further comprises the following steps.

(1.1) Receive a first activation signal by the sensor 442 of the CPU 44 when the CPU 44 detects a presence of the user within the predetermined detecting range of the sensor 442.

(1.2) Receive a second activation signal by the sensor 442 of the CPU 44 after the CPU 44 detects an absence of the user.

(1.3) Determine a time lap between the first and second activation signals as the presence duration of the user.

Therefore, the sensor 442 has the predetermined detecting range that preset in the control processor 441 of the CPU 44, wherein the first activation signal is received when the sensor 442 detects the user within the predetermined detecting range of the sensor 442 as the presence of the user. On the contrary, the second activation signal is received when the sensor 442 detects the user is out of the predetermined detecting range of the sensor 442 as the absence of the user. Thus, the presence duration of the user is determined by the time lap between the first and second activation signals via the sensor 442 of the CPU 44. In other words, the sensor 442 provides dual functions of detecting the presence of the user and determining the presence duration of the user.

It is appreciated that the CPU 44 further comprises a timer 443 electrically linked to the sensor 442, wherein the timer 443 is activated by the sensor 442 to determine the presence duration of the user. When the first activation signal is detected by the sensor 442, the sensor 442 sends a first signal to the timer 443 to start counting the time lap. The sensor 442 sends a second signal to the timer 443 concurrently responding to the second activation signal detected to stop counting the time lap, in such a manner that the presence duration of the user is determined via the sensor 442 and the timer 443, so as to activate the flushing cycle. It is worth to mention that the presence duration of the user will activate different flushing mode with respective volumes of water.

Once the sensor 442 detects the presence of the user, the flushing cycle is started. According to the above described preferred embodiment of the automatic flush actuation apparatus 2, the sensor-operated powering assembly 40 comprises the power generator 43 embodied to be driven by electric motor, the relief valve 30 provided at the valve member 20 to be driven by the power generator 43 for controlling the water flowing, and the actuator 45 which is driven by the power generator 43 to move the relief valve 30 between the auto-operated closed position and the auto-operated opened position. As the auto-operated closed position, the relief valve 30 blocks the water passing to the water outlet 112, and at the auto-operated opened position, the relief valve 30 allows the water passing to the water outlet 112.

According to the preferred embodiment, the driving time of the relief valve 30 driven by the actuator 45 via actuated by the power generator 43 is in responsive to the presence duration, so as to control the volume of water for each flushing cycle in the step (3). In other words, in the step (3), the volume of water used in the flushing cycle is controlled by adjustably controlling the time duration of the flushing cycle.

As it is mentioned above, the valve stopper 32 is arranged to be able to move between the auto-operated closed position to normally close the water passage 31 for stopping the water flowing to the water outlet 112 and the auto-operated opened position to open the water passage 31 for allowing the water flowing to the water outlet for controlling the water flowing from the water inlet to the water outlet.

The actuator 45 is driven by the power generator 43 to rotatably drive the valve stopper 32 of the relief valve 30 to move from the auto-operated closed position to the auto-operated opened position wherein the valve stopper 32 is moved to offset the opening of the water passage 31 for allowing the water passing to the water outlet 112.

Thus, the volume of water is controlled through the control processor 441 by controlling the rotational speed of the actuator 45, in such a manner that when the control processor 441 delays the rotational driving time of the actuator 45 which is activated by the power generator 43, the valve stopper 32 is remaining at the auto-operated opened position longer, so as to have the higher volume of water in the flushing cycle.

As above preferred embodiment of automatic flush actuation apparatus 2, the actuator 45 has the driving end portion having the flat connecting surface 4511 and the curved connecting surface 4512, wherein when the ball shaped valve stopper 32 is connected with the flat connecting surface 4511, the relief valve 30 is at the auto-operated opened position for blocking water flowing to the water outlet 112, and when the actuator 45 is driven to rotate, the curved connecting surface 4512 is connecting with the valve stopper 32 to offset the opening of water passage 31. Thus, the volume of water is capable of being controlled by the rotational speed of the actuator 45 controlled by the control processor 441 delaying the time duration of flushing cycle. In other words, the longer delay of rotation of the actuator 45 will cause the longer time duration of the flushing cycle so as to increase the volume of water used in each flushing cycle. On the other hand, the shorter delay of rotation of the actuator 45 will cause the shorter time duration of the flushing cycle so as to reduce the volume of water used in each flushing cycle.

Accordingly, the step (3) of the present invention further comprises a step (3.1) of selecting one of a plurality of different flushing modes with different volumes of water used in each flushing cycle. According to the preferred embodiment, there are at least two flushing modes, a urinal mode and a toilet mode, preset in the CPU 44. The volume of water used in the flushing cycle at the urinal mode is set lesser than the volume of water used in the flushing cycle at the toilet mode. Therefore, the user is able to pre-select the different flushing modes with different water volumes in different situations. The urinal mode may be selected for a urinal in the male's restroom, since it may need lesser volume of water for each flushing cycle.

In order to provide more selections of different volumes of water for each flushing cycle, the urinal mode has a low volume urinal mode and a high volume urinal mode. For example, the low volume urinal mode is embodied to preset a 90 ms delay time to provide 0.5 gallon water per flushing cycle (gpf), and the high volume urinal mode is embodied to preset a 200 ms delay time to provide 1.0 gpf, as shown in FIG. 9.

The toilet mode also has a low volume toilet mode and a high volume toilet mode.

As shown in FIG. 9, the low volume toilet mode is preferably preset to three different volumes of water having three different delay time respectively, wherein a first delay time is preset to 200 ms for providing 1.0 gpf, a second delay time is preset to 260 ms for providing 1.2 gpf, and a third delay time is present to 430 ms for providing 1.6 gpf. The delay times of the low volume toilet mode are preset in responsive to the presence duration of the user, wherein three timer sequences are preset in the low volume toilet mode, so that if the presence duration of the user is between 0 and 39 seconds timer sequence, 40 and 59 seconds timer sequence, or longer than 60 seconds timer sequence, the first, second, or third delay time of the low volume toilet mode is respectively and automatically activated to actuate the actuator 45 via the control processor 441 to provide 1.0 gpf, 1.2 gpf, or 1.6 gpf water for the flushing cycle respectively.

As shown in FIG. 9, the high volume toilet mode is also preferably preset to three different volumes of water having three different delay time respectively, wherein a first delay time is preset to 260 ms for providing 1.2 gpf, a second delay time is preset to 430 ms for providing 1.6 gpf, and a third delay time is present to 1500 ms for providing 3.25 gpf. The delay times of the high volume toilet mode are preset in responsive to the presence duration of the user, wherein three timer sequences are preset in the high volume toilet mode, so that if the presence duration of the user is between 0 and 39 seconds timer sequence, 40 and 59 seconds timer sequence, or longer than 60 seconds timer sequence, the first, second, or third delay time of the low volume toilet mode is respectively and automatically activated to actuate the actuator 45 via the control processor 441 to provide 1.2 gpf, 1.6 gpf, or 3.25 gpf water for the flushing cycle respectively.

In other words, the longer presence duration of the user activates the higher volume mode in each toilet mode, so that the automatic flush actuation apparatus 2 is able to automatically being activated to complete the flushing cycle and control the volume of water used in each flushing cycle for the automatic flushing system 1. Therefore, the volume of water is able to be automatically adjusted in different circumstances.

It is appreciated that the delay time of the rotational speed of actuator 45 can be preset approximately proportional to the presence duration of the user to control the water volume for each flushing cycle, so as to save the unnecessary waste of flushing water used in each flushing cycle. Usually the shorter delay time, which has lower water volume, is preset for flushing liquid waste. On the contrary, the longer delay time, which has larger water volume, is recommended for flushing solid waste. In other words, each of the low and high volume toilet modes has a delay time approximately proportional to the presence duration of the user, wherein maximum and minimum volume of water used in each flushing cycle are preset respectively in responsive to the presence duration of the user.

Normally the presence duration of the user is shorter when the user only needs to urinate, so that the shorter presence duration activates the flushing mode of shorter delay time. As a result, lower volume of water is used in the flushing cycle for flushing liquid waste. Thus, the volume of water used for each flushing cycle in the automatic flushing system is automatically adjustable in responsive to the presence duration of the user.

It is appreciated that the low and high volumes of each urinal or toilet mode are adapted for being selectively adjusted by the user according to different circumstances. Take a public restroom in a food court for example. During the business rush hour of the food court, such as lunch time or dinner time, there may be full of customers for consuming.

The restroom usage rate may be relatively higher than usual. In order to completely flush all the wastes that accumulate relatively more during the rush hour, the stuff of the food court may switch to high volume flushing mode of each urinal or toilet mode, so that the waste is able to be completely flushed out, so as to keep the public restroom clean.

Accordingly, the flushing cycle is completed in the step (4) in responsive to the presence duration of the user by the control processor 441 of the CPU 44 driving the activator 45 to close the valve stopper 32 of the relief valve 30, so as to stop water passing from the flush channel 121 to the water outlet 112, in such a manner that the flushing cycle is completed by closing the flush channel 121 until flushing cycle is started again.

It is worth to mention that the volumes of water used in each flushing cycle can be controlled by delaying the rotational driving time of the actuator 45 to remain the valve stopper 32 of the relief valve 30 at the auto-operated opened position. The longer of delay time, the higher volume of water is used for the flushing cycle in the flushing system 1. Each flushing modes of the method has different delay times corresponding to the volumes of water. The different presence durations of the user activate different delay time to have different volumes of water used in each flushing cycle in different circumstances.

It is appreciated that the delay time is the time of delaying the rotational driving time of the actuator 45. In other words, the delay time is a time of remaining the valve stopper 32 of the relief valve 30 at the auto-operated opened position. Thus, the water volume of each flushing cycle is increased when the CPU 44 delays the rotational driving time of the actuator 45. The delay time is preset in the control processor 441.

Figure 10A:
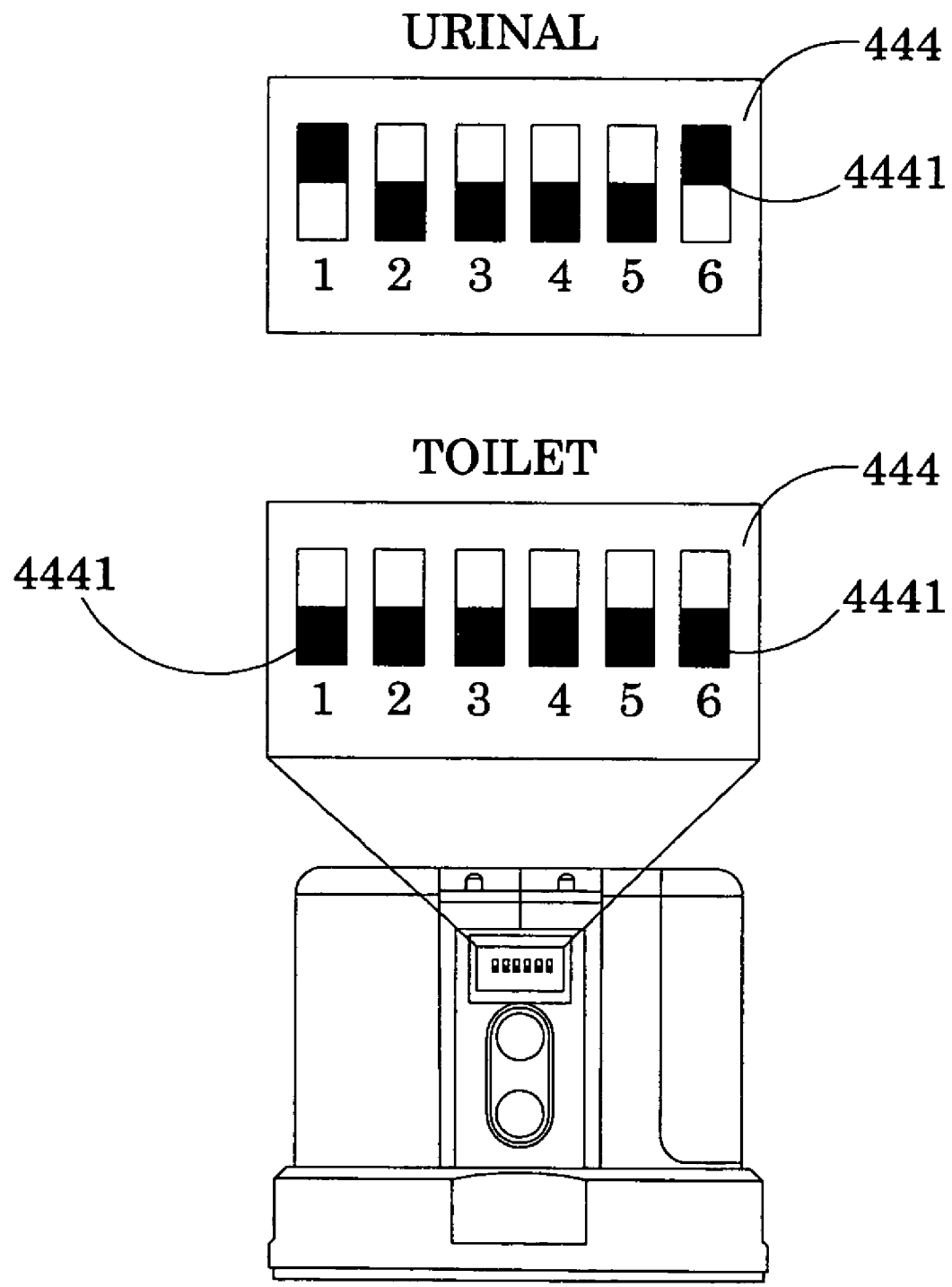
FIG. 10A illustrates the control reference panel of the CPU according to the preferred embodiment of the present invention.

In order to adjustably select the flushing configurations that meet the requirement in accordance with the variety circumstances, the CPU 44 further comprises a control reference panel 444 for selectively configuring to control the time of the flushing cycle, the water volume for each of the flushing cycle, the detecting range of the sensor 442 for detecting the presence duration of the user of the flushing system 1, and the motion of a power generator 43, as shown in FIGS. 10A, 10B, 10C of the drawings.

The control reference panel 444 is electrically connected to the control processor 441 for adjustably selecting the flushing modes, wherein the control reference panel 444 has a plurality of switches 4441 provided for selectively control the CPU 44 to manipulate the settings of the flushing configurations. In the present invention, six switches 4441 are preferably provided, i.e. first, second, third, fourth, fifth, and sixth switches. For example, the first and second switches 4441 are set for selectively adjusting the detecting range of the sensor 442. The third switch 4441 is set for selectively controlling the water saver mode (only effective on urinal mode). The fourth switch 4441 is set for a "ghost" mode. The sixth switch 4441 is set for the fixture mode between toilet and urinal mode.

Each switch 4441 has a function having two selections thereof adapted for adjustably selecting between the two different selections of the function, so that the user is able to selectively choose different selections of each function, so as to generate a plurality of configurations of each flushing cycle. Each of the switches 4441 is adjustably moved between an "up" position and a "down" position as the two selections of each function respectively.

The first and second switches 4441 are embodied for switching the detecting range of the sensor 442, wherein when both first and second switches 444 are moved to the "up" positions, the sensor 442 has longest detecting range preset as 75 cm (30") as an example. When both switches 444 are moved to the "down" positions, the sensor 442 has shortest detecting range preset, for example, as 45 cm (18"). If the first switch 4441 is at the "down" position while the second switch 4441 is at the "up" position, the detecting range of the sensor 442 is preset, for example, to 65 cm (26"). If the first switch 4441 is at the "up" position while the second switch 4441 is at the "down" position, the detecting range of the sensor 442 is preset, for example, to 55 cm (22"), as shown in FIG. 10C.

Accordingly, the third switch 4441 is embodied for selecting the water saver mode, which is preferably only activated during the urinal mode. When the third switch is at the "down" position, the water saver function for saving water used for each flushing cycle is turned off, and if the third switch is at the "up" position, the water saver is activated for saving water every other flushing cycle under the urinal mode.

The fourth switch 4441 is embodied as the "ghost" flush function adapted for selectively choosing a default step of automatically self-starting the flushing cycle at a predetermined time preference in no responsive to the presence of the user. In other words, the "ghost" flush mode is selected for self-cleaning the flushing system. For instance, if the "ghost" flush function is preset to 12 hours as the time preference, the flushing cycle is automatically started every 12 hours no matter there is a user or not. Take in the department store for example, the "ghost" flush function is capable of automatically flushing at 9 a.m. when the store is just opened, and at 9 p.m. when the store is about to close, such that the public restroom of the store is able to automatically keep itself clean.

The fifth switch 4441 is embodied for selectively controlling the water volume for each flushing cycle, wherein the "down" position of the fifth switch 4441 is low volume of water, and the "up" position is high volume of water. The sixth switch 4441 is embodied for selectively manipulating the flushing mode, the urinal mode when the sixth switch 4441 is at the "up" position and the toilet mode of the flushing mode at the "down" position. Therefore, when the fifth switch 4441 is at "up" and sixth switch 4441 is at "down" position, the configuration of the flushing cycle is high volume toilet mode, as shown in FIG. 10C.

Accordingly, through the combination of the selections of each function on the control reference panel 444, the present invention provides the variety of configurations for being adjustably selected. As shown in FIG. 10A, the recommended switch sequences of the flushing configurations of urinal and toilet mode are illustrated. In the urinal mode, the first and sixth switches 4441 are at "up" position while the second to fifth switches 4441 are at the "down" position, so that the configuration of the flushing cycle is low volume urinal mode having the detecting range of 5 cm (22"). In the toilet mode shown in FIG. 10A, all the switches 4441 of the control reference panel 444 are at the "up" position, so that the configuration of the flushing cycle is low volume toilet mode as mentioned above having the detecting range of 75 cm (30").

It is appreciated that the control reference panel 444 can be wirelessly controlled by a remote control to select the functions of the flushing modes, the volume of water used in each flushing cycle, the ghost mode, and the detecting range of the sensor 442. For example, the flushing systems 1 in the public restroom can be synchronized with each other such that the automatic actuation apparatuses 2 can be concurrently controlled via the remote control and/or a central control to selectively adjust the configuration of the automatic actuation apparatuses 2 at the same time.

Thus, in the step (3.1), the method further comprises a step of selecting the selections of each function on the control reference panel 444 which includes the configuration of the flushing cycle to select the flushing mode, such as high volume urinal mode or low volume toilet mode, the detecting range of the sensor 442, the automatic flush activation via the "ghost" mode, the fixture mode, and the volume of water used in each flushing cycle.

The step (4) completes the flushing cycle to stop water passing to the water outlet 112 by closing the flush channel 121 until flushing cycle is started again by the step (1.1) of receiving the first activation signal. The time duration of the flushing cycle, which is the time of allowing the water passing through the flush channel 121, is in responsive to the presence duration of the user, and controlled by actuator 45 driven via the power generator 43 to move the valve stopper 32 of the relief valve 30 between the auto-operated closed and opened position, so as to control the volume of water used for each flushing cycle.

Accordingly, the automatic flush actuation apparatus 2 of the present invention is capable of incorporating with most conventional flushing systems to provide the sensor operation of the flushing system for controlling the flushing cycle and for adjusting the volume of water used in each flushing cycle. By incorporating the CPU 44 of the present invention to the conventional flushing system, the operator of the flushing system is able to select different flushing modes of the flushing system and to adjust the volume of water in each flushing mode.

One skilled in the art will understand that the embodiment of the present invention as shown in the drawings and described above is exemplary only and not intended to be limiting.

It will thus be seen that the objects of the present invention have been fully and effectively accomplished. The above embodiments are shown and described for the purposes of illustrating the functional and structural principles of the present invention and is subject to change without departure from such principles. Therefore, this invention includes all modifications encompassed within the spirit and scope of the following claims.

What is claimed is:

1. Method of controlling volume of water used in each sensor-operated flushing cycle of a flushing system comprising an automatic flush actuation apparatus, comprising the steps of:
   (a) detecting a presence duration of a user by a CPU of said automatic flush actuation apparatus;
   (b) starting said flushing cycle by allowing water flowing from a water inlet to a water outlet through a flush channel of said flushing system through said automatic flush actuation apparatus;
   (c) adjustably controlling a volume of water used in said flushing cycle for said flushing system by controlling a time duration of said flushing cycle; and
   (d) completing said flushing cycle in responsive to said presence duration of said user to stop water passing to said water outlet by closing said flush channel until said flushing cycle is started again.

2. The method, as recited in claim 1, wherein the step (c) further comprises a step of presetting at least two different flushing modes with different volumes of water used in said flushing cycle.

3. The method as recited in claim 2 wherein, in the presetting step, urinal mode and toilet mode are preset in said flushing modes respectively that said volume of water used in said flushing cycle at said urinal mode is set lesser than said volume of water used in said flushing cycle at said toilet mode.

4. The method, as recited in claim 3, wherein, in said toilet mode, a high volume toilet mode and a low volume toilet mode in responsive to said time duration of said flushing cycle are further preset, wherein said high volume toilet mode is configured with relatively high volume of water used in said flushing cycle in responsive to longer time duration thereof, wherein said low volume toilet mode is configured with relatively low volume of water used in said flushing cycle in responsive to shorter time duration thereof.

5. The method, as recited in claim 4, wherein said high volume toilet mode and said low volume toilet mode are configured in responsive to said presence duration of said user, wherein said high volume toilet mode is activated when longer presence duration is detected while said low volume toilet mode is activated when shorter presence duration is detected.

6. The method, as recited in claim 5, wherein three different timer sequences are configured in said low volume toilet mode in responsive to said presence duration in condition that:
   (i) 1.0 gpf (gallon per flush) of water is used for completing said flushing cycle when said presence duration is detected with a range between 0 and 39 seconds;
   (ii) 1.2 gpf (gallon per flush) of water is used for completing said flushing cycle when said presence duration is detected with a range between 40 and 59 seconds; and
   (iii) 1.6 gpf (gallon per flush) of water is used for completing said flushing cycle when said presence duration is detected longer than 60 seconds.

7. The method, as recited in claim 5, wherein three different timer sequences are configured in said high volume toilet mode in responsive to said presence duration in condition that:
   (i) 1.2 gpf (gallon per flush) of water is used for completing said flushing cycle when said presence duration is detected with a range between 0 and 39 seconds;
   (ii) 1.6 gpf (gallon per flush) of water is used for completing said flushing cycle when said presence duration is detected with a range between 40 and 59 seconds; and
   (iii) 3.25 gpf (gallon per flush) of water is used for completing said flushing cycle when said presence duration is detected longer than 60 seconds.

8. The method, as recited in claim 5, wherein said flushing cycle is completed by moving a relief valve of said automatic flush actuation apparatus from an auto-operated closed position to an auto-operated opened position and back to said auto-operated closed position, wherein, in the step (c), said time duration of said flushing cycle is adjustably controlled in responsive to a time period of said relief valve at said auto-operated opened position for adjustably controlling said volume of water used in said flushing cycle.

9. The method as recited in claim 5 wherein, in the step (c), said flushing cycle of said flushing system is controlled by said CPU which is adapted to control said time duration of said flushing cycle and said water volume for each said flushing cycle.

10. The method as recited in claim 9 wherein, in the step (a), said presence duration of said user is detected when said user is out of a detecting range of a sensor of said CPU to start said flushing cycle.

11. The method as recited in claim 10 wherein, in the step (a), said presence duration of said user is detected by the steps of:

(a.1) receiving a first activation signal by a sensor of said CPU when said CPU detects a presence of said user;
(a.2) receiving a second activation signal by said sensor of said CPU after said CPU detects an absence of said user; and
(a.3) determining a time lap between said first and second activation signals as said presence duration of said user.

12. The method, as recited in claim 11, wherein, in the step (a.3), said time lap is determined by a timer of said CPU.

13. The method, as recited in claim 11, wherein said volume of water used in said flushing cycle is proportional to said presence duration of said user.

14. The method, as recited in claim 13, further comprising a default step of automatically self-starting said flushing cycle at a predetermined time preference in no responsive to a presence of said user.

15. The method, as recited in claim 5, further comprising a default step of automatically self-starting said flushing cycle at a predetermined time preference in no responsive to a presence of said user.

16. The method, as recited in claim 3, wherein said high volume toilet mode and said low volume toilet mode are configured in responsive to said presence duration of said user, wherein said high volume toilet mode is activated when longer presence duration is detected while said low volume toilet mode is activated when shorter presence duration is detected.

17. The method, as recited in claim 1, wherein said flushing cycle is completed by moving a relief valve of said automatic flush actuation apparatus from an auto-operated closed position to an auto-operated opened position and back to said auto-operated closed position, wherein, in the step (c), said time duration of said flushing cycle is adjustably controlled in responsive to a time period of said relief valve at said auto-operated opened position for adjustably controlling said volume of water used in said flushing cycle.

18. The method as recited in claim 1 wherein, in the step (c), said flushing cycle of said flushing system is controlled by said CPU which is adapted to control said time duration of said flushing cycle and said water volume for each said flushing cycle.

19. The method as recited in claim 18 wherein, in the step (a), said presence duration of said user is detected when said user is out of a detecting range of a sensor of said CPU to start said flushing cycle.

20. The method, as recited in claim 1, further comprising a default step of automatically self-starting said flushing cycle at a predetermined time preference in no responsive to a presence of said user.

* * * * *